TRANSISTOR OPERATED SERVO SYSTEM USING DIRECT CURRENT MOTORS

Filed June 17, 1960 4 Sheets-Sheet 1

INVENTOR.
CHARLES MARSHALL
BY Alfred W. Barber
ATTORNEY

INVENTOR.
CHARLES MARSHALL
BY Alfred W. Barber
ATTORNEY

*INVENTOR.*
CHARLES MARSHALL
*BY* Alfred W. Barber
ATTORNEY

INVENTOR.
CHARLES MARSHALL
BY Alfred W. Barber
ATTORNEY

Patented Apr. 27, 1965

3,181,051

TRANSISTOR OPERATED SERVO SYSTEM USING DIRECT CURRENT MOTORS

Charles E. Marshall, Port Washington, N.Y., assignor to Potter Instrument Co., Inc., Plainview, N.Y., a corporation of New York Filed June 17, 1960, Ser. No. 36,859
8 Claims. (Cl. 318—341)

The present invention concerns servo motor systems and, in particular, servo motor devices as applied to magnetic tape transport systems.

In most computer systems magnetic tape is used for one or more purposes. In order to utilize the storage function of this magnetic tape it is necessary to utilize a tape transport capable of being programmed in almost every possible way within its limitations of speed, reversal time, etc. The handling of magnetic tape may be divided into two essential functions or characteristics. One of these functions concerns the movement of the tape forward or backward including stopping and reversing. The other function concerns the storage of the tape on reels and of making it always available at the motion control point for whatever command may be forthcoming. It is this latter function with which the present invention deals.

In the system of the present invention, magnetic tape is carried on two storage reels. The tape is passed from one of these storage reels to the other over a path which includes the recording/reproducing head and the mechanism for moving the tape in either direction. Also between the reels and the other mechanism there are tensioning devices, one on each side. These tensioning devices may conveniently be a pair of so called tension arms. Tension arms are movable devices carrying tape idler rollers over which the tape is threaded. They are usually spring loaded and when in a predetermined position impart the desired predetermined tension to the tape. When the tape is moved, if the tension is thereby changed, the tension arm position changes and some device attached to the tension arm sends out a signal which controls the take up reel. The take up reel in response to this signal is driven in a direction to restore the tension and position of the corresponding tension arm. The present invention concerns improved methods of and means for this control of the take up reels in response to the motion of the tension arms to maintain accurately the tension and position of these arms so as to maintain the tape in a position for most flexible programming by the tape pulling device.

Accordingly one object of the present invention is to provide a method of and means for controlling tape reels having improved characteristics.

Another object is to control tape reels in such a manner as to greatly reduce program limitations.

Still another object is to provide a fast acting reel control system which is stable and free from oscillation.

A further object is to provide reel control utilizing transistors which is stable and functions well over a wide temperature range.

These and other objects will be apparent from the detailed description of the invention given in connection with the various figures of the drawing, of which:

The following is a brief description of the present invention and its mode of operation in its preferred form.

To begin, a D.C. servo motor is employed to rotate a take-up reel for magnetic tape or the like. This magnetic tape passes between two such take-up reels and across a recording/reproducing head and at one or more points in its path between the two take-up reels is maintained at a predetermined tension by a tension arm or other constant tension device. Also in the path between the two take-up reels there is provided one or more tape driving devices such as a pinch roller. When a command is given to start moving the tape, the pinch roller makes contact with the tape and starts to move it usually with a considerable acceleration. When the tape starts to move, it plays out of one slack loop at one tension arm and into another slack loop at the other tension arm. Some form of transducer is provided at each of the tension arms to detect any change in tension in the tape and through the medium of suitable servo amplifiers and detectors, to translate the change in tension into compensating power to drive the servo motor in a direction to reestablish the initial tension. In this case the feedback loop of the servo system includes the tape and tension arm transducer.

Figure 1:
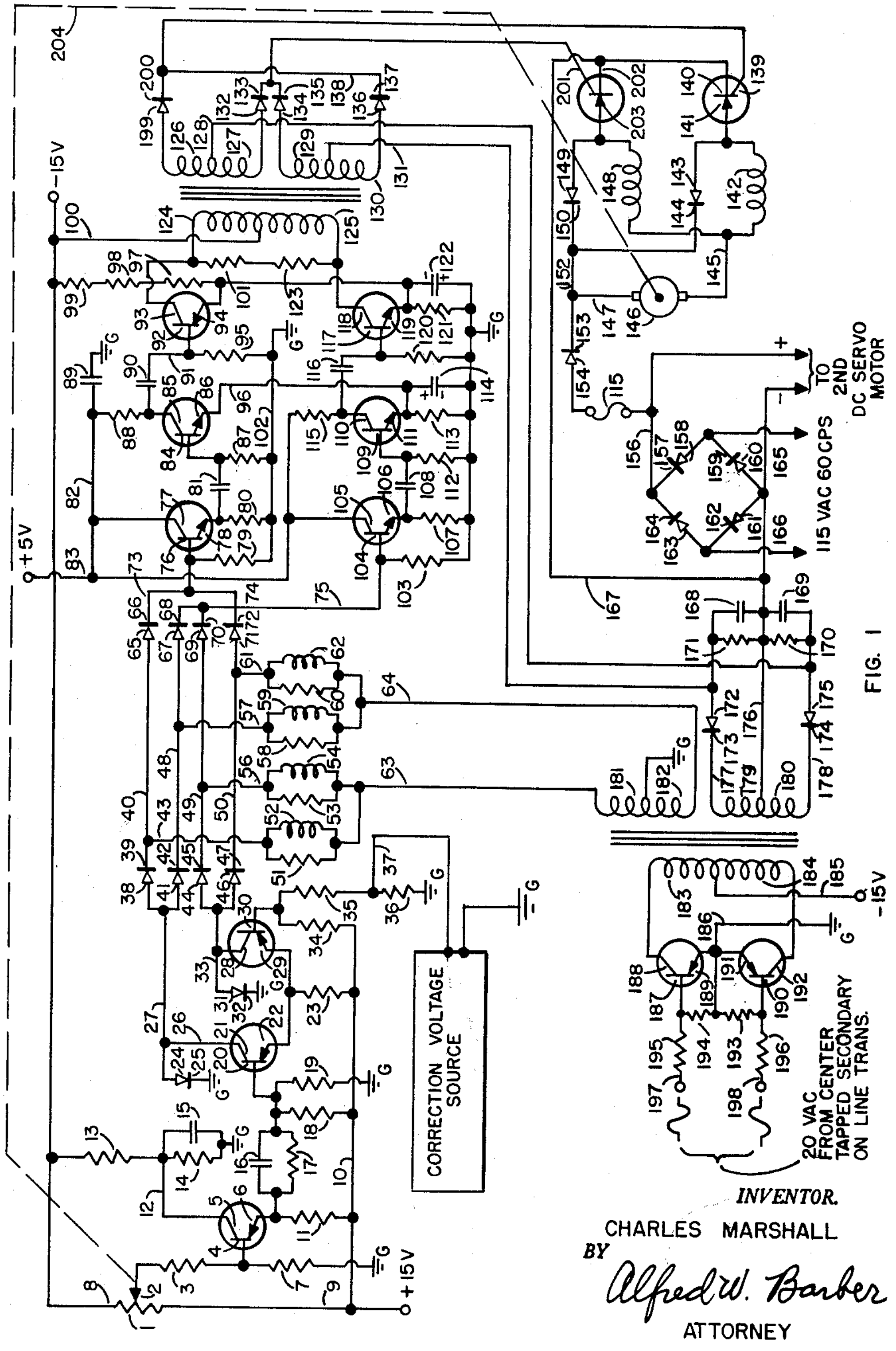
FIG. 1 is a detailed schematic diagram of the control system.

FIG. 1 shows a transducer consisting of potentiometer 1 with variable contact 2 which may be assumed to be mechanically coupled to a tension arm carrying magnetic tape, not shown. It may also be assumed that servo motor 146 drives tape take-up reels for holding the tape which is passed over the above mentioned tension arms. The take-up reels are not shown as they are conventional and well known in the art. Between potentiometer variable contact 2 and servo motor 146 are connected various amplifiers and associated circuits to be described. Arm 2 is connected to base 4 of transistor 4–5–6 through resistor 3 and across resistor 7 which when taken with collector series resistor 13 and shunt load consisting of resistor 14 in parallel with capacitor 15 and emitter resistor 11 establishes desired operating conditions. As potentiometer arm 2 is moved by the tension arm, the voltage at emitter 6 swings from approximately plus 5 volts to an equal negative voltage. One end of potentiometer 1 is connected to source of positive voltage (plus 15 volts) and the other end to a source of negative voltage (minus 15 volts). Emitter 6 is returned to the positive voltage through resistor 11 and collector 5 is returned to the negative voltage through resistor 13. The voltage at emitter 6 determined by the transistor, its circuit and bias voltages and the instantaneous position of arm 2 is applied through "lead" network 16–17 to base 20 of transistor 20–21–22. Base 20 is also connected through resistor 18 to plus 15 volts and through resistor 19 to ground G. When arm 2 is at or near its center position, it has been found that the voltage at base 20 is approximately plus 4.4 volts. As arm 2 moves back and forth due to the motion of the tension arm to which it is connected, the resulting voltage at base 20 varies. However, the "lead" circuit consisting of resistor 17 shunted by capacitor 16 differentiates the varying voltage at emitter 6 and superimposes an additional voltage at base 20 which may actually overcome and reverse the voltage which would otherwise appear there. Thus, the "lead" network has the function of supplying information to base 20 concerning the rate of change of position of the tension arm. A large voltage supplied in this manner indicates a very rapid change in tension arm position and the resulting large voltage swing is passed on through the balance of the circuit, to be described, and results in a large counteracting final effect.

Transistors 20–21–22 and 28–29–30 are connected as a differential amplifier. Emitters 22 and 29 are returned to the positive 15 volt point through the common resistor 23 which causes transistor 28–29–30 to be driven as a common base circuit. Collector 21 is connected to the anode 24 of diode 24–25 over lead 26 and to anodes 38 and 41 of diodes 38–39 and 41–42 over lead 26. Collector 28 is connected to anode 31 of diode 31–32 over lead 33 and to anodes 44 and 46 of diodes 44–45 and 46–47. Base 30 is maintained at a predetermined bias at approximately plus 4.4 volts by resistor 34 connected to plus 15 volts and resistors 35 and 36 connected in series to ground G. This differential amplifier operates in such a manner that when the potential of base 20 is made more positive, collector current to collector 21 decreases and the potential of emitter 22 increases in a positive direction. This causes the current to collector 28 to increase. This then functions as a differential amplifier since the current to one collector increases as the current to the other collector decreases.

Turning now to another portion of the circuit, a square wave signal is generated by transistors 187–188–189 and 190–191–192 and transformer 183–184–181–182–179–180 and associated circuits. Alternating line current is applied at points 197 and 198 through base current limiting resistors 195 and 196 and across voltage division resistors 194 and 193 to bases 187 and 190. The junction between resistors 193–194 and emitters 189–191 are connected together and to ground G. Collector 188 is connected to primary 183 and collector 192 is connected to primary 184 and their common lead 185 is returned to a source of minus 15 volt bias. These transistors and associated circuits provide a line frequency square wave which appears for utilization across secondaries 181–182 and 179–180.

The square wave across secondaries 181–182 are substantially equal and of opposite phase. The square wave voltage from secondary 181 of one phase is applied over lead 63 to saturable reactors 52 and 54 shunted by resistors 51 and 53 respectively. The reverse phase square wave from secondary 182 is applied over lead 64 to saturable reactors 59 and 62 shunted by resistors 58 and 60 respectively. The ends of the saturable reactors opposite the square wave drive ends are connected to points in the diode network. Reactor 52 is thus connected to the junction between cathode 39 and anode 65 over lead 43. Reactor 54 is connected to the junction between cathode 45 and anode 69 over lead 56. Reactor 59 is connected to the junction between cathode 42 and anode 67 over lead 57. Reactor 62 is connected to the junction between cathode 47 and anode 71 over lead 61. Cathodes 66 and 72 are connected together and to transistor base 76 over leads 73 and 74 and across base to ground resistor 79. Similarly cathodes 68 and 70 are connected together and to transistor base 104 over lead 75 and across base to ground resistor 103. The object of this portion of the circuit is to pulse bases 76 and 104 with pulses of such polarity and duration as to represent the correction required in the servo motor. The circuitry between these bases and the servo motor are mainly for transforming the pulses to controlled power for driving the motor.

A description of the operation of the circuit up to this point will aid in understanding the present invention. The square waves applied to saturable reactors 52, 54, 59 and 62 from secondaries 181 and 182 send to reactors into saturation on the negative half cycle of the wave and with the system in balance due to arm 2 being near the center of potentiometer 1, these reactors will stay in saturation for the full square wave cycle. When this condition exists, since the saturable reactors always saturated, no signal is passed on to bases 76 and 104. If, however, the collector 21 or 28 is more negative than approximately plus 1 volt established by diodes 24–25 and 31–32 respectively, current will not flow through the corresponding saturable reactors for the full negative half cycle of their applied square waves due to the net voltage at their return points being less than zero and they will be less saturated. Any saturable reactor thus receiving saturating current during less than a full half cycle will come out of saturation during the latter part of the following half cycle of positive voltage swing. This action of coming out of saturation developes a swing of positive voltage which will pass through one of diodes 65–66, 67–68, 69–70 or 71–72 and appear on either base 76 or 104 as a positive voltage pulse. This pulse indicating a displacement of arm 2 will activate circuits to be described resulting in drive current being supplied to servo motor 146 in such a direction as to tend to restore the position of arm 2 to its center position.

If a positive pulse is applied to base 76 of transistor 76–77–78 across resistor 79 as set forth above, collector 77 will become more conductive resulting in increased current over lead 83 and from emitter 78 through resistor 80. The pulse thus provided in resistor 80 is coupled through capacitor 81 and across resistor 87 to base 84 of transistor 84–85–86 causing its collector 85 to become more conductive and drawing a pulse of current through resistor 88 over lead 82 and across capacitor 89. The voltage pulse thus developed across resistor 88 is applied to base 92 of push-pull driver transistor 92–93–94 through capacitor 90 and across resistor 95. Emitter 94 is provided with suitable bias by series resistors 97–98–99 connected to a suitable bias source, not shown, and shunt resistor 121 by-passed by capacitor 122. The output of push-pull transistor 92–93–94 is coupled to half primary 124. In a similar manner positive pulses applied to base 104 of transistor 104–105–106 and across resistor 103 appear amplified across emitter resistor 107. These pulses across resistor 107 are applied through coupling capacitor 108 to base 109 and across resistor 112. Collector 110 receives its bias through load resistor 115 which develops an output pulse. Emitter 111 is connected to emitter 86 and self-bias resistor 113 shunted by capacitor 114. The output pulse across resistor 115 is applied to push-pull transistor 117–118–119 through capacitor 116 and across resistor 120. Emitter 119 receives its bias in the same manner as does emitter 94. Collector 118 is connected to half primary 125. The push-pull primary 124–125 is shunted by stabilizing load resistors 101 and 123 connected in series. Thus pulses applied to base 76 are amplified and applied to half primary 124 and pulses applied to base 104 are amplified and applied to half primary 125 so that the pulses across full primary 124–125 from the two sources are substantially equally amplified and applied in opposite phase.

Pulses applied to primary 124–125 appear as square wave pulses of one polarity during one-half of the line frequency period and the opposite polarity during the second half. These pulses are repeated across secondaries 126–127–129–130 in the same polarity across secondaries 126 and 129 and the opposite polarity across secondaries 127 and 130. Some of these pulses are passed on to control silicon controlled rectifiers 139–140–141 and 201–202–203 and some are inhibited depending on their phase and time relationship to inhibit signals supplied to the secondaries over leads 128 ad 131. The inhibit signals are half period negative square wave signals derived from the square wave generator described above and feeding transformer having windings 179 through 184. The square waves generated by this generator and appearing across secondaries 179 and 180 are applied to rectifier 172–173 over lead 177 and to rectifier 174–175 over lead 178 which are connected to load circuits consisting of resistor 171 shunted by capacitor 168 and resistor 170 shunted by capacitor 169 and returned to common lead 176. It will be seen that these connections supply negative half period pulses to leads 128 and 131 during alternate half cycles of the line current applied at 197–198. Now rectifiers 136–137, 134–135, 132–133 and 199–200 are all connected to pass only positive pulses. This automatically eliminates from consideration all negative pulses appearing across secondaries 126–127–129–130. The inhibit pulses on lines 128 and 131 further eliminate any positive pulses which occur during the half cycle of negative inhibit signal applied to the respective secondaries. The positive pulses which survive are applied to either rectifier control electrode 139 or 201 causing conduction in the rectifier receiving the positive pulses and thereby passing current through either servo motor field 142 or 148.

Servo motor 146 is of the series field direct current type. Direct current to drive this motor is derived from an alternating current line over leads 165–166 which is rectified by suitable means such as the bridge rectifier 157 through 164. This rectification provides a positive polarity on lead 156 and a negative polarity on common return circuit lead 176. The positive 156 is connected to motor 146 through suitable protective devices such as fuse 155 and rectifier 153–154 and over lead 147. In series with motor 146 are its two field windings 142 and 148 connected by common lead 145 and returning to the negative or common side of the power source 176 over lead 167 and through silicon controlled rectifiers 139–140–141 and 201–202–203 respectively. Thus conduction in the first of these rectifiers will cause field current to flow in field winding 142 and in the second in field winding 148. One of these may arbitrarily be designated as the clockwise winding i.e. the field which when excited causes clockwise rotation of the motor and the other as the counter clockwise winding since its excitation will cause motor rotation in the opposite direction. For purposes of illustration, I have chosen to designate winding 142 as the clockwise and 148 as the counter clockwise. Rectifier 143–144 is connected from the low side of field winding 142 over leads 151 and 152 to the high side of the motor at lead 147 in order to suppress excessive surges of current due to sudden reductions in current supplied to the field from the controlled rectifier. Similarly rectifier 149–150 connected to the low side of field winding 148 is returned over lead 152 to high side lead 147 in order to suppress surges built up in field winding 148.

In operation, when arm 2 departs from its mean position, error signals are generated resulting in a series of pulses at either collector 93 or 118. For purposes of explanation, assume that these pulses appear at collector 93 and across primary 124 and hence across secondaries 126–127–129–130. Also for purposes of explanation, assume that the correction in the system requires clockwise rotation of the servo motor, i.e. excitation of field winding 142. Under these assumptions, the positive pulses of the signal across secondaries 127 and 129 will occur at such times as to be totally inhibited by the inhibit signals over leads 128 and 131 and no positive control pulses will be passed through rectifiers 132–133–134–135 to controlled rectifier control electrode 201. Also at the same time positive pulses across secondaries 126 and 130 will occur during uninhibited periods and will be passed by rectifiers 199–200 and 136–137 to control electrode 139 causing controlled rectifier 139–140–141 to conduct and pass current through motor 146 and series field 142 initiating clockwise rotation of the motor. When the motor has rotated sufficiently to return arm 2 to its mean position, pulses will cease to appear in the rectifier control circuit and the motor will be turned off. Had arm 2 been moved in the opposite direction from its mean position, pulses would appear at collector 118 and secondaries 126 etc., but all but the positive and uninhibited pulses across secondaries 127 and 129 would be eliminated. These pulses passing through rectifiers 132–133–134–135 would actuate control electrode 201 causing controlled rectifier 201–202–203 to draw current energizing motor 146 and series field 148 and producing counterclockwise rotation of the servo motor and returning arm 2 toward its mean position.

Figure 3:
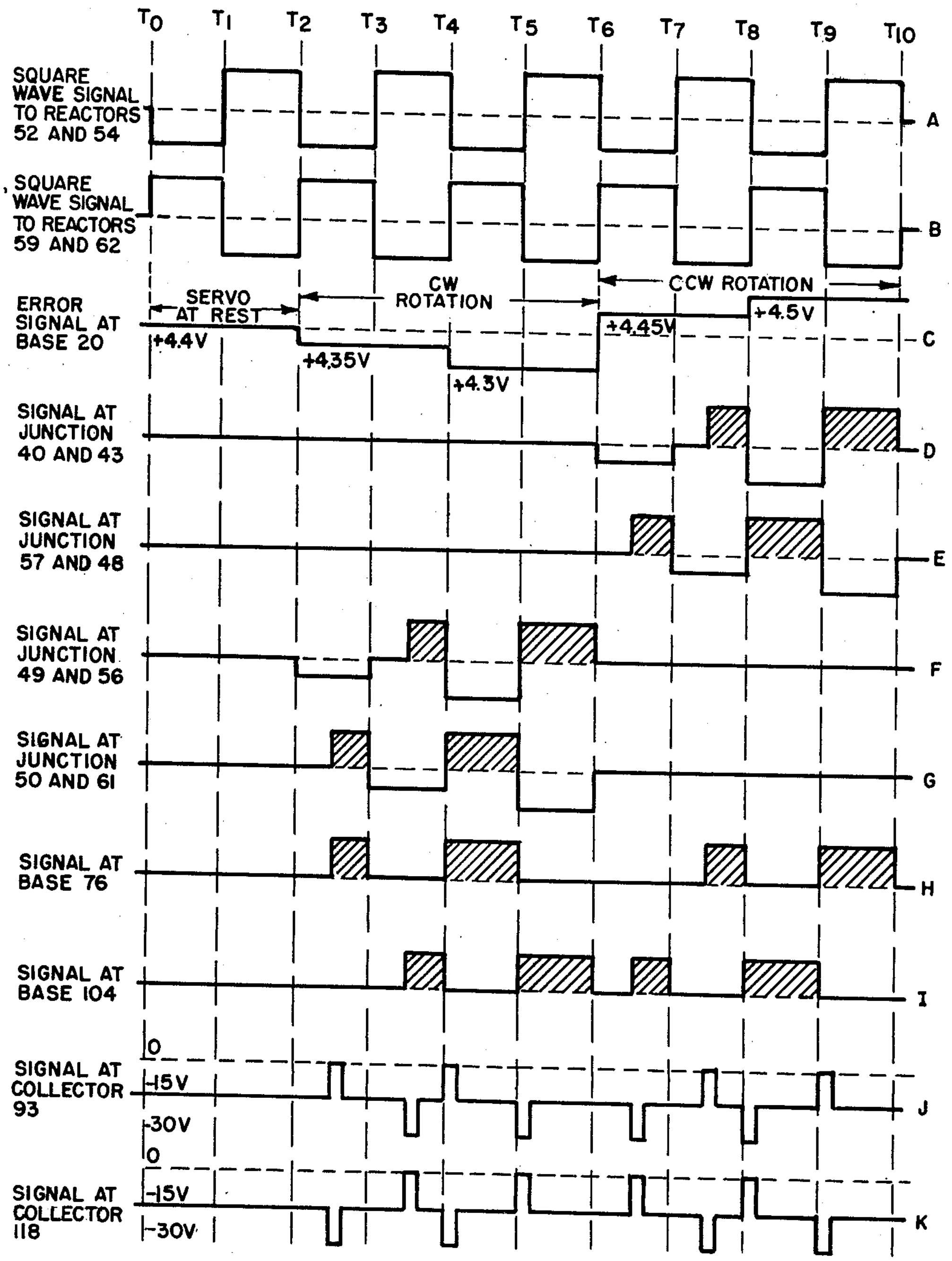
FIG. 3 depicts representative waveforms at various points throughout the circuit.
Figure 3:
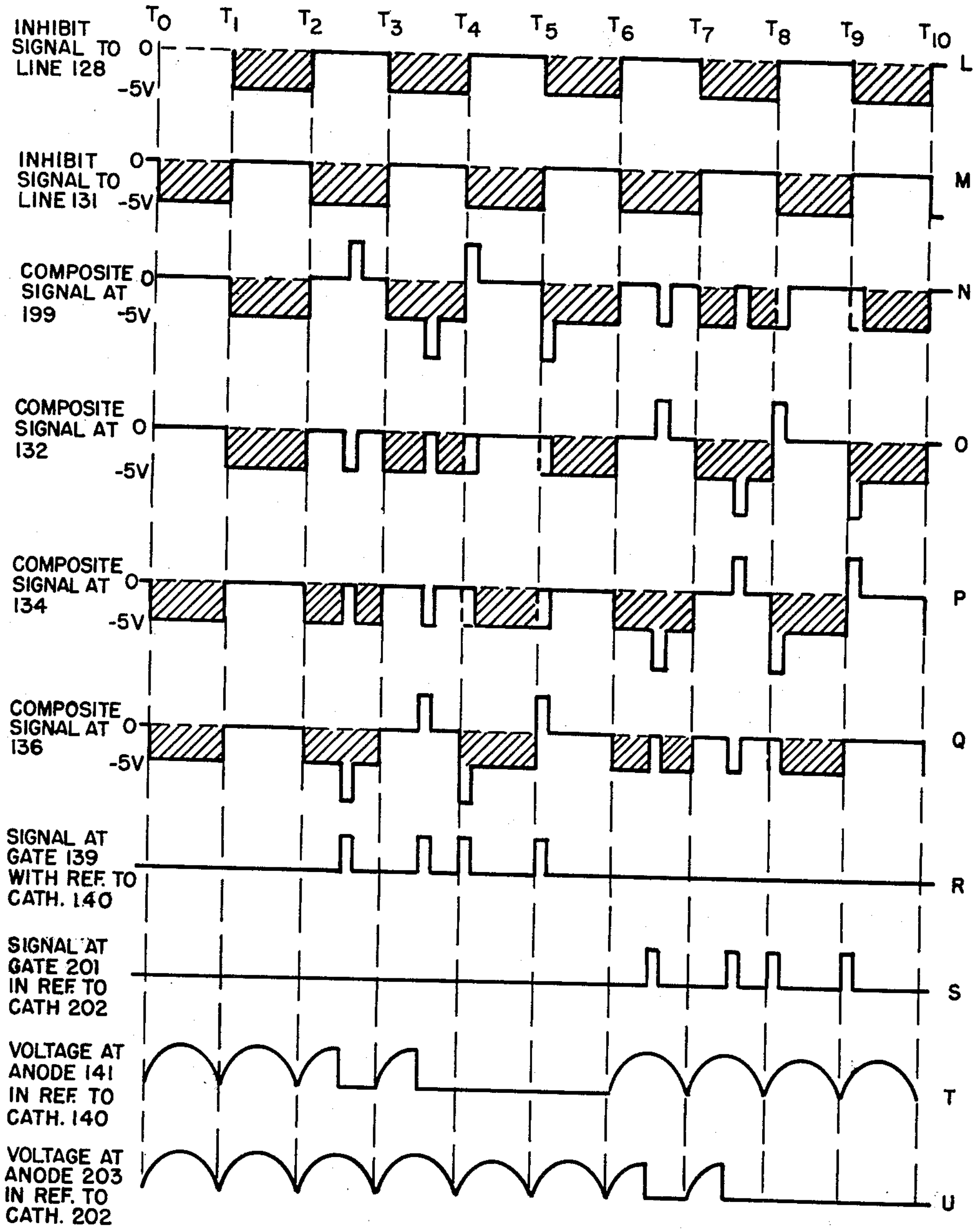

The above description of the circuit and its operation may be more clearly understood by reference to the signals shown in the two sheets of FIG. 3 lines A through U. Each line shows a signal at a point in the circuit designated by the descriptions immediately to the left of each line. Each signal is shown for a full cycle of the line frequency under five different assumed conditions. The period $T_0$ to $T_1$ is one half cycle under conditions of balance with the servo motor at rest and period $T_1$ to $T_2$ is the second half of this cycle. Period $T_2$–$T_3$–$T_4$ is for two half cycles (making one complete cycle) during which arm 2 is displaced by a small amount which requires a clockwise (CW) rotation of the servo motor for restoration. Period $T_4$–$T_5$–$T_6$ illustrates two half cycle periods of displacement in this same direction but by a larger amount and resulting in a higher powered correction drive of the servo motor. Period $T_6$–$T_7$–$T_8$ represents two half cycle periods of displacement of arm 2 in the opposite direction calling for counter-clockwise (CCW) correctional rotation of the servo motor and period $T_8$–$T_9$–$T_{10}$ another two half cycle period in which CCW correction is called for but in an increased amount. A clear understanding of the invention may be gained by following the above description in connection with these signal representations. Finally it may be described that correction signals on lines R and S have one further characteristic and that is time of occurrence during a half cycle. Lines T and U represent voltages across the two controlled rectifiers. It will be appreciated that the presence of voltage across the rectifiers indicates that they are non-conducting. It will also be seen that conduction starts where this voltage drops to zero and that this start of current corresponds with the time of occurrence of the controlling pulses of lines R and S. Since the amount of correctional power supplied to the servo motor is proportional to the time during which this power is supplied, earlier occurrence of the controlling pulses is produced by greater departures of arm 2 and results in longer periods of motor current flow. Thus during periods $T_2$–$T_3$–$T_4$ the rectifier gate control pulses occur near the center of the periods and servo motor current is supplied for approximately one half of each half cycle period at a time. In the same manner during periods $T_4$–$T_5$–$T_6$ the control gate signals occur at the start of the half wave periods producing substantially full time current flow during each half cycle.

Figure 2:
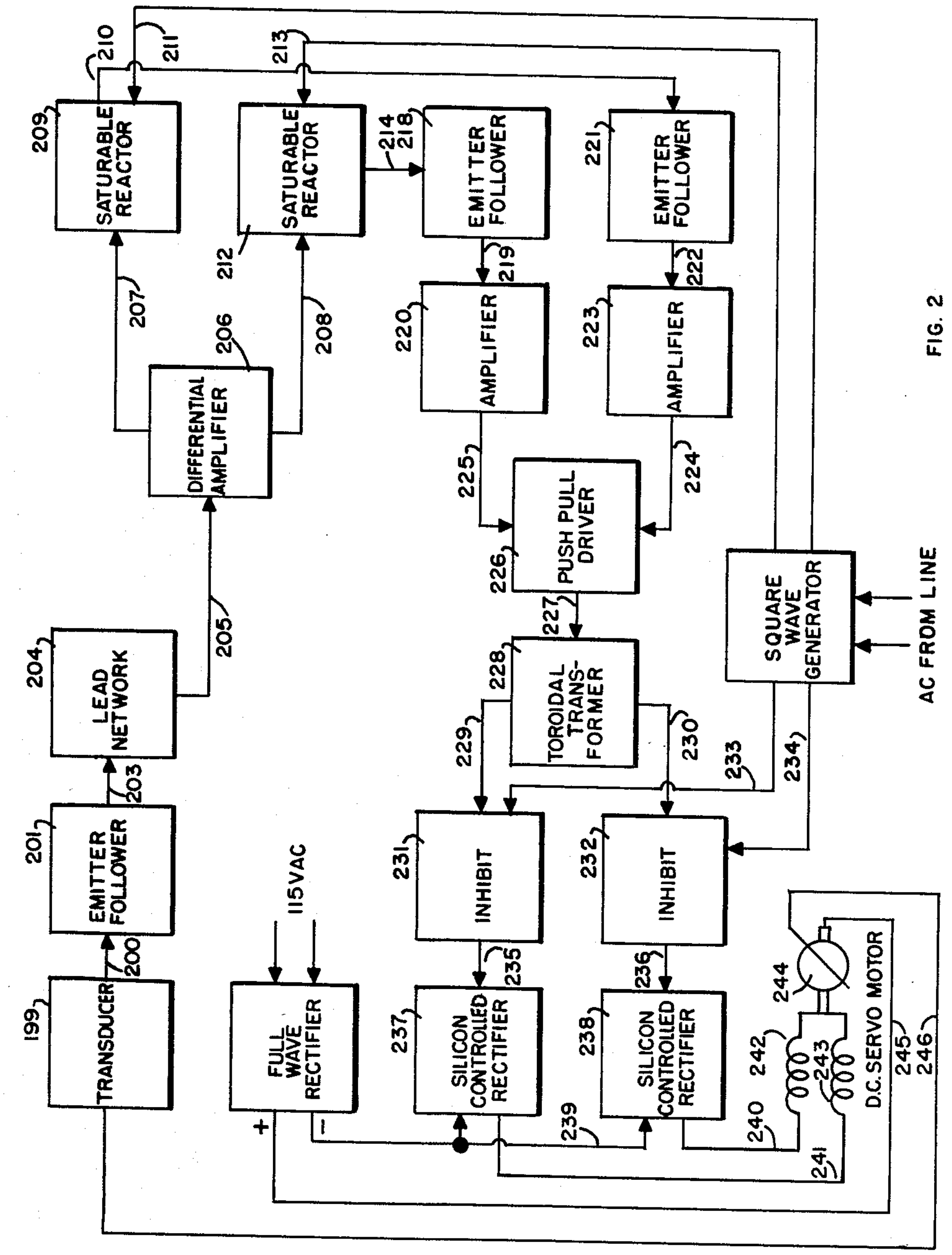
FIG. 2 is a block diagram representation of the control system.

FIG. 2 shows a block diagram illustrating the preferred form of the present invention and its major components. Box 199 represents the transducer (potentiometer 1–2 of FIG. 1) and 244 represents the servo motor which feeds back to the transducer over link 246. Error signals from transducer 199 are applied over lead 200 to emitter follower 201 the output of which in turn is applied over connection 203 to "lead" network 204. The compounded signals from the "lead" network are applied to differential amplifier 206 over connection 205. The differential output over leads 207 and 208 is applied to saturable reactors 209 and 212 which are simultaneously supplied with square wave signals from the square wave generator over leads 211 and 213. The resulting positive return from saturation pulses, if any, from reactor 209 are applied over lead 210 to emitter follower 221 the output of which is applied over lead 222 to amplifier 223. Similarly positive return pulses from reactor 212 are applied to emitter follower 218 over lead 214 which in turn drives amplifier 220 over lead 219. Amplifiers 223 and 220 excite push-pull driver 226 over leads 224 and 225 respectively. The push-pull driver 226 feeds toroidal transformer 228 over lead 227. The output of toroidal transformer 228 over leads 229 and 230 is combined in inhibit circuits 231 and 232 also supplied with square waves over leads 233 and 234 and producing control signals over leads 235 and 236 for silicon controlled rectifiers 237 and 238. Now servo motor 244 is operated CW or CCW by excitation of one of fields 242 or 243 over leads 240 or 241 from the rectifiers 238 and 237 respectively, power for the motor being derived from the full wave rectifier over leads 239 and 245. The specific circuit connections and detailed mode of operation will be found in the detailed description of the complete circuit diagram of FIG. 1 and the explanatory signals shown in FIG. 3.

While only a single embodiment of the present invention has been shown and described, many modifications will be apparent to those skilled in the art and within the spirit and scope of the invention as set forth in the appended claims.

What is claimed is:

1. In a servo system, the combination of, a servo motor, a signal transducer coupled to said motor, a source of alternating current, means for deriving square wave current from said alternating current, means for passing a portion of said square wave current through a plurality of saturable reactors, means for passing a second portion of said square wave current to a controlled rectifier circuit to partially determine the power applied to said motor, a differential amplifier coupled to said signal transducer and to said saturable reactors for determining the mode of saturation of said reactors in accordance with predetermined operation of said transducer, and amplifiers for amplifying desaturation signals from said reactors for completing the determination of power applied to said motor through said controlled rectifier circuit.

2. In a servo motor drive system, the combination of, a direct current servo motor, a polarized signal transducer coupled to said motor for indicating a predetermined condition to be maintained in a device driven by said motor, a source of square wave current, a plurality of saturable reactors, means for passing a portion of said square wave current through said reactors, a plurality of controlled rectifiers for controlling driving power current to said motor, means for passing a second portion of said square wave current to control circuits for said controlled rectifiers for partially controlling said rectifiers, a differential amplifier coupled to said signal transducer for determining the desaturation point of said reactors in accordance with said signal, and amplifiers for amplifying desaturation signals from said reactors for completing the control of said rectifiers to control driving power current to said motor.

3. In a servo motor drive system, the combination of, a direct current servo motor for driving a device to be positionally controlled, a polarized signal transducer coupled to said driven device for generating signals characteristic of the departure in position of said driven device from a predetermined position, a source of direct current for driving said motor, a pair of controlled rectifiers for controlling said direct current to said motor, a source of square wave current, a differential amplifier for combining a portion of the current from said square wave source and signals from said transducer to provide differential square wave signals in response to the departure of said driven device from said predetermined position, and means for controlling said differential square wave signals with a portion of said square wave current to provide contiguous half cycle square wave control pulses to said controlled rectifiers to determine driving current passed by said rectifiers to said motor.

4. In a servo motor drive system, the combination of, a direct current servo motor, a polarized signal transducer coupled to said motor for generating signals proportional to the departure of a device driven by said motor from a predetermined position, a differentiating circuit for generating signals in accordance with the rate of change of position of said driven device, means for combining the two said generated signals including a differential amplifier, a source of square wave current, a plurality of saturable reactors coupled to said source of square wave current to saturate said reactors during a predetermined half cycle of each cycle of said square wave, directional coupling devices connected between said differential amplifier to control the desaturation points of said reactors in accordance with said combined signals, means for amplifying desaturation pulses from said saturable reactors, a pair of controlled rectifiers for controlling driving current applied to said motor from a direct current source, and diode switching circuits interconnecting said square wave current source and said desaturation pulse amplifier to provide a square wave gated control signal to said controlled rectifiers to control the rotation of said motor to tend to restore the position of said driven device to said predetermined position.

5. In a system as set forth in claim 4 and including means coupled to said differential amplifier for electrically modifying the predetermined position of said driven device.

6. In a system as set forth in claim 4 in which said square wave source is coupled to an alternating current power line.

7. In a system as set forth in claim 4 in which said gated control signal is a series of pulses equal in repetition to twice the repetition rate of said square waves.

8. In a system as set forth in claim 4 and in which said control signal consists in substantially equal amplitude pulses of variable duration and at a repetition rate twice the repetition rate of said square wave.

References Cited by the Examiner

UNITED STATES PATENTS

| | | | |
|---|---|---|---|
| 2,659,850 | 11/53 | Phillips et al. | 318—341 X |
| 2,778,982 | 1/57 | Loeffler | 318—345 X |
| 2,964,647 | 12/60 | Rubinstein | 323—89 |
| 2,976,479 | 3/61 | Chausee | 318—513 X |
| 2,977,523 | 3/61 | Cockrell | 307—88.51 |
| 3,029,376 | 4/62 | Manteuffel. | |
| 3,083,327 | 3/63 | Byloff | 318—341 X |

ORIS L. RADER, *Primary Examiner.*

MILTON O. HIRSHFIELD, JOHN F. COUCH, *Examiners.*